April 7, 1964 R. D. PETERS ETAL 3,127,716
MACHINE TOOL LOADER
Filed Nov. 25, 1960 5 Sheets-Sheet 5
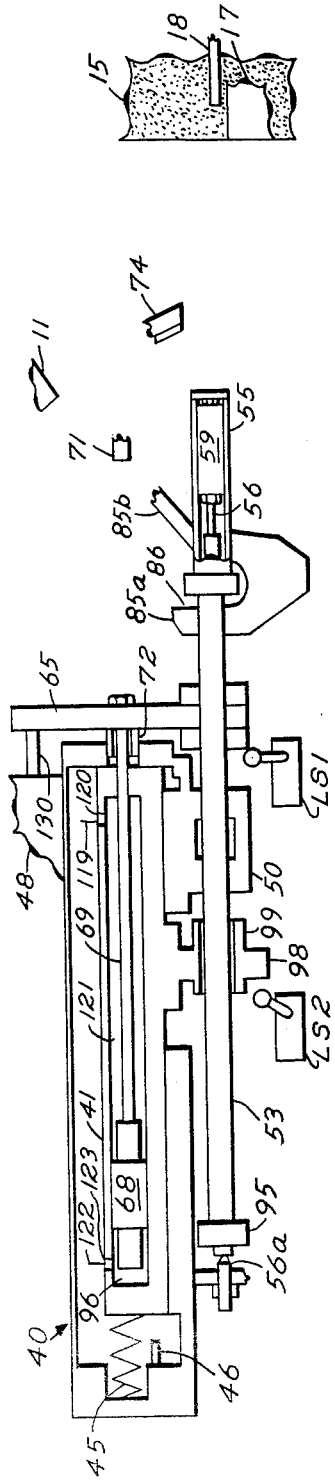
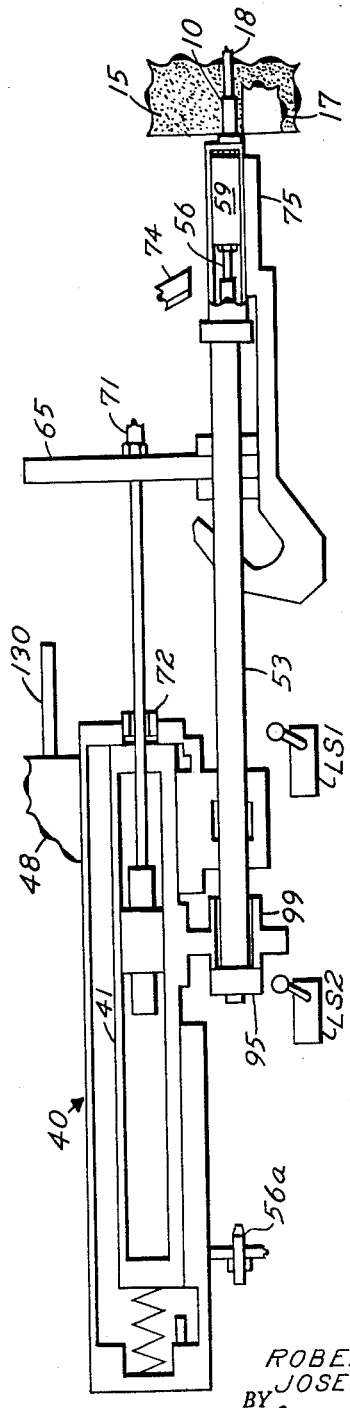
INVENTOR.
ROBERT D. PETERS
JOSEPH F. UCKOTTER
BY
ATTORNEYS

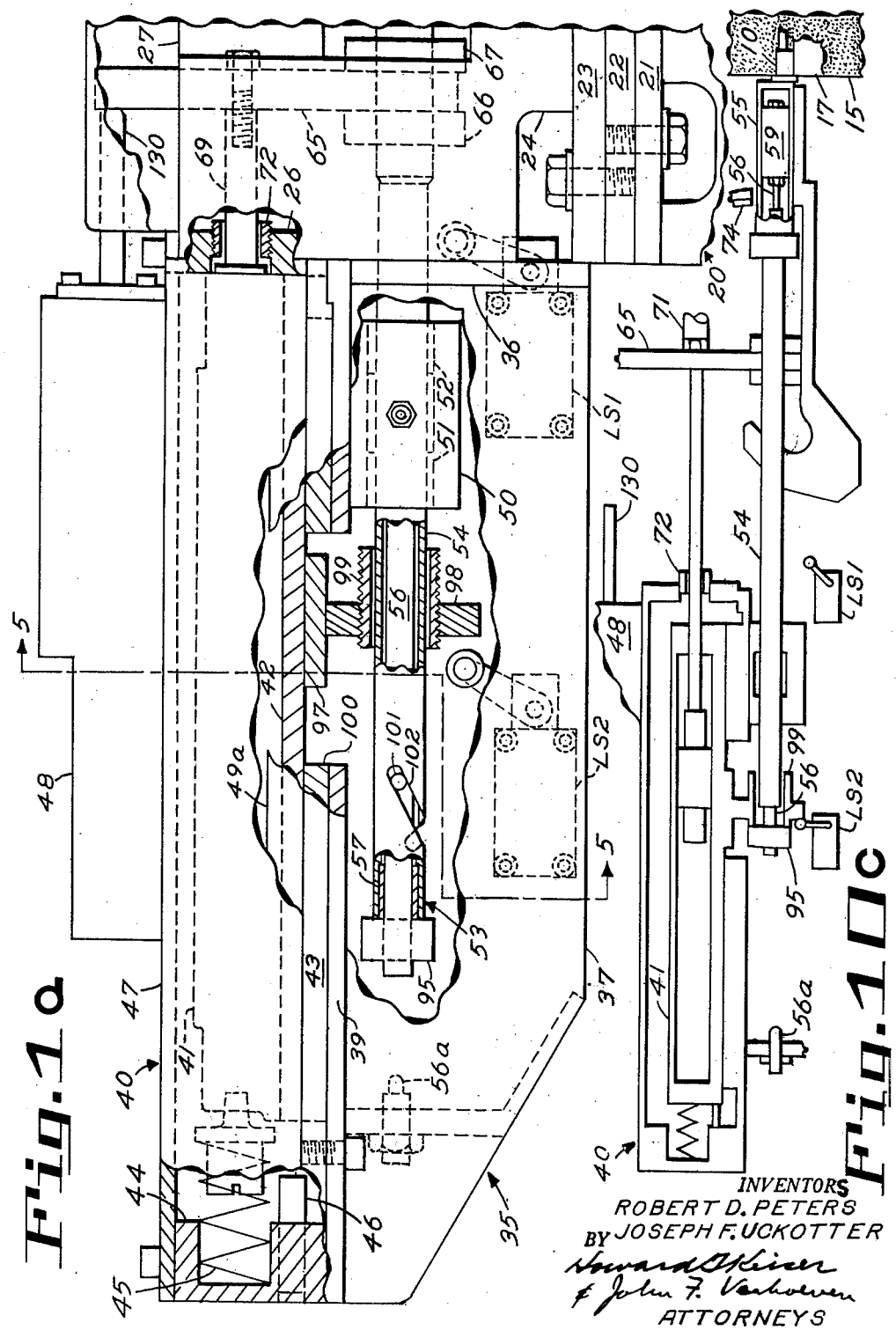

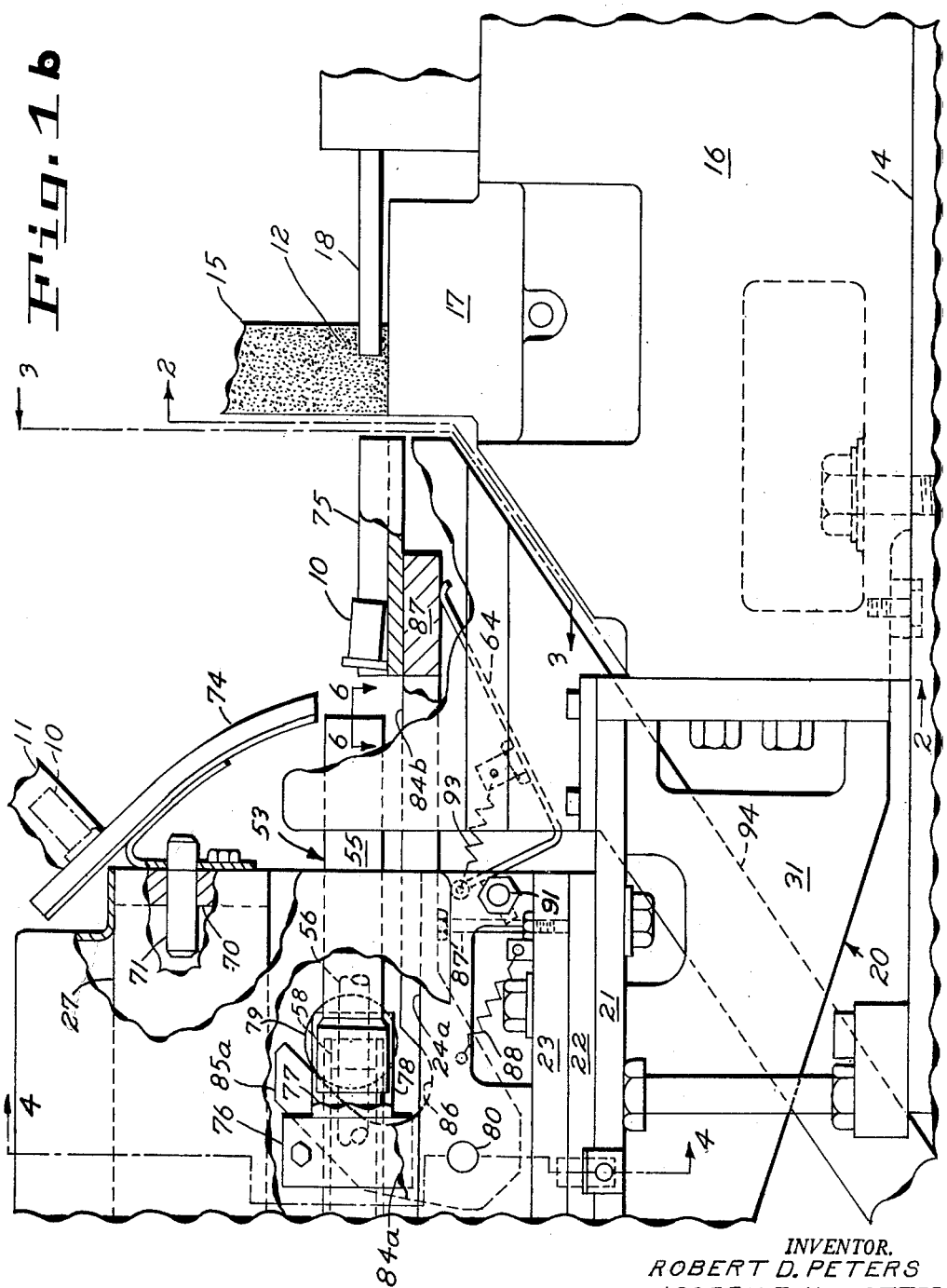

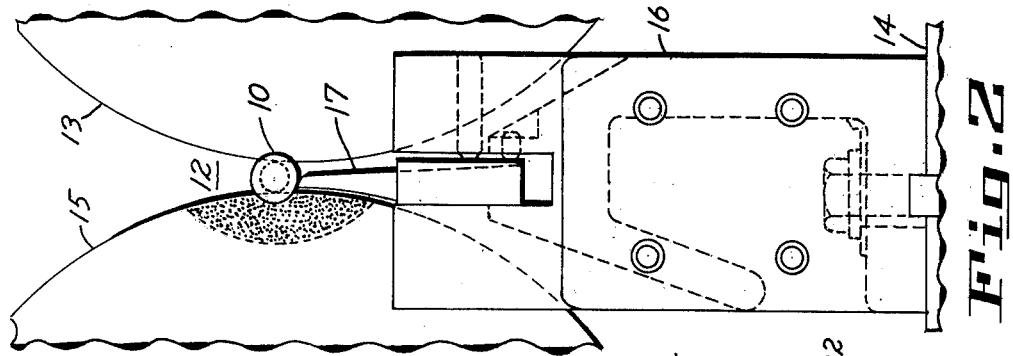
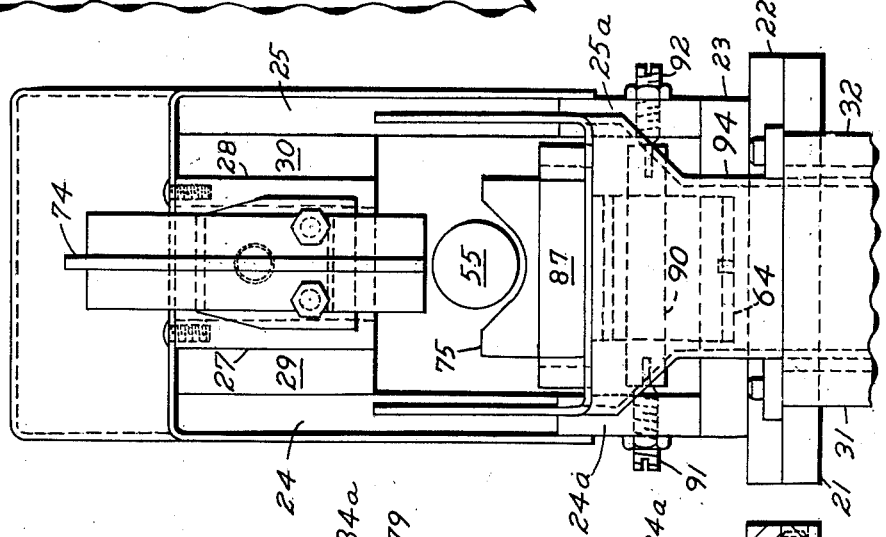
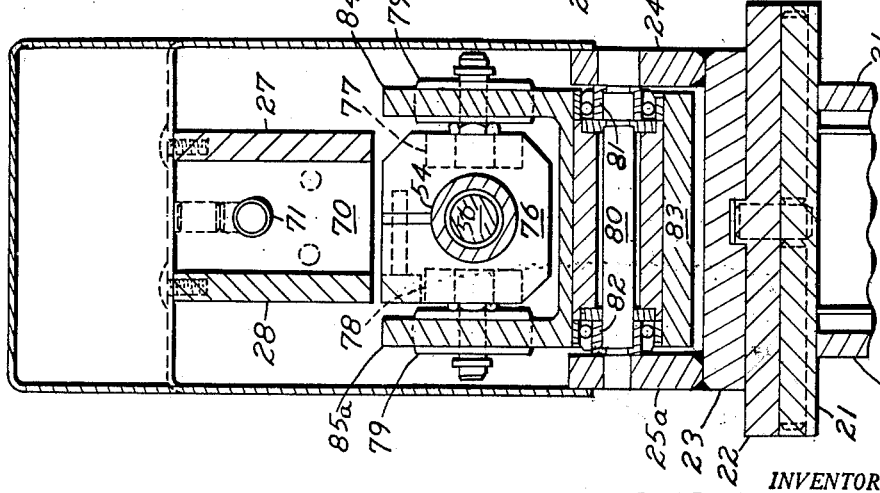
INVENTOR.
ROBERT D. PETERS
JOSEPH F. UCKOTTER
ATTORNEYS

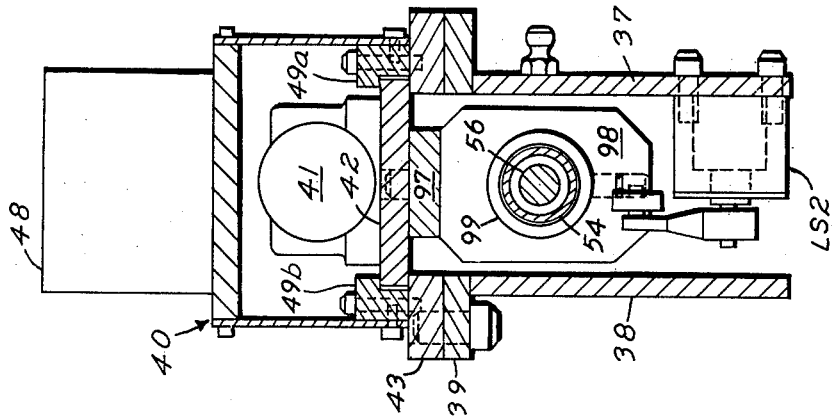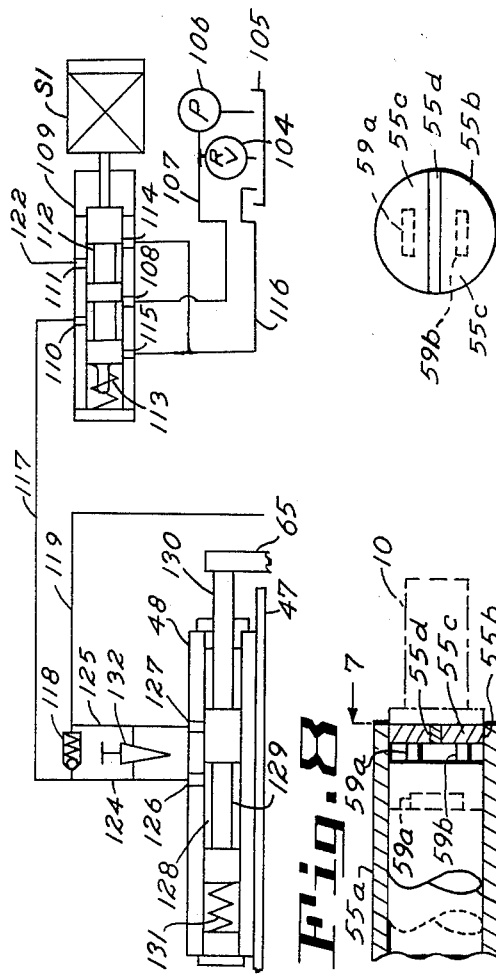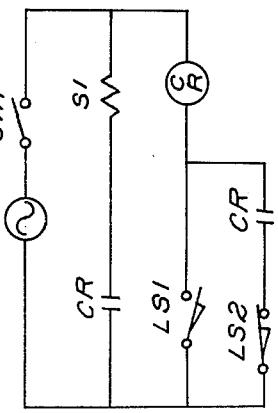

United States Patent Office 3,127,716
Patented Apr. 7, 1964

3,127,716
MACHINE TOOL LOADER
Robert D. Peters, Cincinnati, Ohio, and Joseph F. Uckotter, Covington, Ky., assignors to The Cincinnati Milling Machine Co., Cincinnati, Ohio, a corporation of Ohio
Filed Nov. 25, 1960, Ser. No. 71,707
9 Claims. (Cl. 51—215)

The present invention relates to a machine tool loader, particularly suitable for the rapid automatic loading of workpieces successively in a centerless grinder.

For machining a large quantity of workpieces it is desirable to load each workpiece into the machine tool as quickly as possible to minimize the nonoperating time of the machine. Fast loading, however, requires rapid acceleration and deceleration of the workpiece and this type of movement renders it difficult to maintain control of the workpiece during the loading cycle. The use of jaws or chucks on a controlled injector, or loading, member to grip the workpiece for control thereof requires awkward releasing mechanism and, when the workpiece must be deposited with precision in a confined space such as the grinding throat of a centerless grinding machine, releasable jaws or chucks are frequently impractical. On the other hand, if the workpiece is advanced freely without being gripped by the injector member, and a positive stop in the path of the freely advancing workpiece is relied on to arrest its movement and stop the workpiece in the desired location, the movement of the workpiece, if too rapid, will result in the freely moving piece bouncing off the stop and coming to rest in an improper location or at an improper orientation.

In the present invention there is provided a workpiece loader having a motor operated injector member which grips a workpiece magnetically as it rapidly advances the workpiece toward a desired position such as the operating zone. The injector member (and the workpiece held thereon) can be abruptly stopped with the workpiece in the desired position and, because the magnetic grip of the injector on the workpiece is maintained until after the workpiece has stopped, control over the workpiece is not lost during loading. After the injector member has stopped with the workpiece in the desired position, the injector member automatically releases its magnetic grip on the workpiece and retracts therefrom.

In the preferred form of the invention the injector member comprises an axially reciprocable plunger which has a pemanent magnet therein to provide the gripping force which holds the workpiece for control thereof until the plunger is stopped. The magnet is movable within the plunger between a position effective to hold the workpiece against the plunger and a position where its magnetic force is ineffective to hold the workpiece thereon. During the loading cycle the magnet is shifted within the plunger, after the plunger and workpiece have stopped with the workpiece in the desired position, to release the workpiece before retraction of the plunger. The advance of the plunger, the subsequent retraction of the magnet within the plunger after the workpiece is in position, and retraction of the plunger after release of the workpiece, is achieved by a single hydraulic motor mounted and operable in a manner to assure proper sequencing of the loader mechanism during rapid operation thereof.

It is therefore one object of the present invention to provide an improved rapid loader for a machine tool capable of retaining positive control over a workpiece.

It is another object of the present invention to provide an improved rapid loading mechanism for a machine tool capable of gripping a workpiece as it is rapidly inserted in a confined zone and operable automatically to release the workpiece therein.

It is yet another object of the present invention to provide a loader with an improved injector motor construction operable to effect advance of the injector and workpiece, release of the workpiece from the injector, and retraction of the injector from the workpiece in rapid sequence.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

In the drawings:

FIG. 1a is a view with parts broken away of the rear end, or the end away from the operating zone, of the loading mechanism of the present invention;

FIG. 1b is a view similar to FIG. 1a except that it shows the forward end of the loading mechanism;

FIG. 2 is a view taken on line 2—2 of FIG. 1b showing the operating zone, or grinding throat of the centerless grinder, with a workpiece shown in the operating position;

FIG. 3 is a view taken on line 3—3 of FIG. 1b;

FIG. 4 is a view taken on line 4—4 of FIG. 1b;

FIG. 5 is a view taken on line 5—5 of FIG. 1a;

FIG. 6 is a view taken on line 6—6 of FIG. 1b showing a workpiece in phantom lines as gripped by the plunger during advance;

FIG. 7 is a view taken on line 7—7 of FIG. 6;

FIG. 8 is a schematic diagram showing the hydraulic circuit of the loader;

FIG. 9 is a schematic diagram showing an electrical circuit for the loader;

FIG. 10a is a schematic drawing showing the relative positions of parts of the loader as a workpiece is taken from the magazine;

FIG. 10b is a drawing similar to FIG. 10a but showing the relative positions of parts of the loader as the workpiece is brought to the desired position in the operating zone; and FIG. 10c is a drawing similar to FIGS. 10a and 10b but showing the relative position of the parts of the loader after the workpiece has been released from the plunger and the plunger is ready to retract.

In the illustrative embodiment of the present invention described herein a series of workpieces 10 are moved successively from a storage position, such as in a magazine indicated at 11 in FIG. 1b, to a desired position in the operating zone defined by the grinding throat 12 of a centerless grinding machine. As shown best in FIG. 2 the grinding machine has a regulating wheel 13 mounted on a slide 14 for movement relative to the grinding wheel 15. A workpiece support 16 is mounted on the slide 14 and includes a blade 17 extending up between the wheels, the wheels and blade defining the grinding throat 12. At the end of each grind cycle of the regulating wheel is retracted a short distance for ejection of the ground workpiece and receipt of an unground workpiece in the throat. In the operation illustrated the workpiece, after being deposited in the grinding throat, is plunge ground by movement of the regulating wheel toward the grinding wheel while the workpiece is held in a fixed axial position against the ejector rod 18 (see FIG. 1b) which is actuated after completion of the grind to propel the workpiece out of the throat from the same side thereof into which it was loaded.

As shown in FIGS. 1a and 1b the supporting structure for the loader includes a forward bracket 20 connected at its forward end to the workpiece support 16 and having two spaced webs 31, 32 on which is mounted an upper plate 21. Plate 21 supports two stacked base plates 22 and 23. Base plate 22 is adjustable laterally relative to bracket plate 21 and upper base plate 23 is adjustable longitudinally relative to base plate 22 but both plates are secured relative to bracket 20 after suitable adjustments have been made thereto. The upper base plate 23 has secured thereon a pair of side plates 24, 25 between the upper portion of which is secured a rear end plate 26. The lower portions 24a, 25a of side plates 24, 25 extend forwardly and below a second pair of side plates 27, 28 which are connected to inwardly turned flange portions 29, 30 (see FIG. 3) on side plates 24, 25 and extend forwardly therefrom.

A rear bracket 35 has a forward end plate 36 connected to the rear end of side plates 24, 25 and below end plate 26 of the forward bracket 20. A pair of side plates 37, 38 (see FIG. 5) of rear bracket 35 extend rearwardly from end plate 36 and support an upper bracket plate 39. A housing, indicated generally at 40, has a lower plate 43 secured to the upper plate 39 of rear bracket 35 and the housing is closed at its forward end by rear end plate 26 of the forward bracket assembly. The housing 40 and brackets 20 and 35, which are secured together and fixed relative to the slide 14, comprise the frame for the loading mechanism.

The housing receives cylinder 41 which has a base plate 42 connected thereto. The base plate is slidably mounted on housing plate 43 for longitudinal or axial movement relative to the frame housing 40 between side guide bars 49a and 49b. The rear end plate 44 of the housing 40 receives a spring 45 engaged with the cylinder 41 which normally urges the cylinder 41 forwardly relative to the housing 40. The end plate 44 also has a pin 46 mounted therein to limit the rearward movement of the cylinder 41 relative to the housing 40. The forward movement of the cylinder 41 relative to the housing is limited by engagement of the forward end of the cylinder with end plate 26. The upper plate 47 of the housing supports control valve 48.

Connected to and depending from the upper plate 39 of rear bracket 35 between side plates 37, 38 thereof is a bearing block 50 carrying spaced sleeve bearings 51, 52 which slidably support a plunger 53 for axial movement. The plunger 53, which defines an injector member to advance a workpiece to the grinding throat, comprises an outer casing, or sleeve, 54 and a casing, or shell 55 having a closed forward end connected to the forward end of sleeve 54. The casing 54 has sleeve bearings 57, 58 snugly secured therein which slidably receive rod 56 for axial shifting relative to the sleeve 54. The rod 56 carries, at its forward end, magnet 59 (see FIG. 6) which is slidably received in the casing 55.

A bar 65 (FIG. 1a) is secured relative to sleeve 54 of the plunger 53 by two collars 66, 67 straddling the bar and secured on the sleeve. The bar 65 extends upwardly between the side plates (24—25, 27—28) of the forward bracket. The cylinder 41 has a piston 68 (see FIG. 10a) slidably received therein, the rod 69 of which extends through end plate 26 and connects to bar 65 to actuate the plunger 53. A block 70 (FIG. 1b) is secured between the upper pair of side plates 27, 28 at the forward end thereof and has a piston stop pin 71 mounted therein to limit the forward movement of the piston, and hence the forward movement of the plunger 53. The stop pin 71 is longitudinally positioned so that with the cylinder 41 in its normal forward position in the cylinder housing 40, bar 65 will abut against stop pin 71 before the end of the piston stroke in the cylinder. The rearward movement of bar 65 is limited by the adjustable sleeve 72 (FIG. 1a) threadedly received in end plate 26.

Axial movement of the plunger sleeve 54 actuates a swingable workpiece receiving trough member 75 (FIGS. 1b and 3) which, in its upper position, recieves a workpiece from magazine 11 and, in its lower position, is in the path of the advancing plunger. A guide bar 74 holds a workpiece received from magazine 11 in trough member 75 as the trough member descends. A block 76 clamped to the sleeve 54 of the plunger has two arms 77, 78 extending forwardly on each side of the sleeve 54. Each arm supports a roller 79 on the outboard side thereof as shown best in FIG. 4. A shaft 80 is journaled in the side plate portions 24a, 25a below the plunger and has mounted thereon by ball bearings 81, 82, a hub 83. Hub 83 has two pairs of extending arms 84a—84b, 85a—85b, one pair on each side of the sleeve 54. The two arms of each pair define a slot 86 therebetween adapted to engage and receive one of the rollers 79. A block 87 secured between the forwardly extending arms 84b, 85b at the forward end thereof (FIG. 1b) supports the workpiece receiving and guiding trough 75. When the plunger sleeve 54 and the rollers 79 carried thereby are in the position shown in FIG. 1b, or any position forward thereof, the arms 84b, 85b, and trough 75 are in their lowermost position, the trough 75 being in substantially horizontal alignment with blade 17 and the arms 84b, 85b supported by bolt 87' mounted in base plate 23. The arms and trough are normally biased in this position by spring 88 connected between hub 83 and base plate 23. Rearward movement of the plunger sleeve 54 and rollers 79 from the position shown in FIG. 1b will cause the rollers to engage the arms 84a, 85a and thereby swing the trough upwardly. With the rollers in their most rearwardly position when the plunger sleeve 54 is fully retracted, trough 75 is immediately below magazine 11 to receive a workpiece therefrom.

A deflector 64 is connected to a shaft 90 (FIGS. 1b and 3) which is supported for rotation in pins 91, 92 mounted in side plate portions 24a, 25a. The deflector is normally urged upwardly by spring 93 connected between the deflector and side plate portion 24a but the deflector is depressed, as shown in FIG. 1b, by block 87 when the trough member 75 is in its lowermost position. A workpiece receiving chute 94 is mounted on the forward end of upper plate 21 of the forward bracket 20 and extends between the webs 31, 32 thereof. When the trough member 75 is raised, as it is when the operation on the workpiece is completed, and the piece is ejected by rod 18, the deflector extends into the path of an ejected workpiece and deflects it into chute 94.

The magnet rod 56 extends through the plunger assembly sleeve 54 and protrudes from the rear end thereof, as shown in FIG. 1a. The rod has a collar 95 secured thereon which abuts against the rear end of sleeve 54 when the magnet 59 abuts against the forward end of magnet casing 55. A magnet rod stop pin 56a is mounted in the rear bracket 35 between the side plates and in registration with the magnet rod. The pin 56a is positioned longitudinally so that when sleeve 54 is in its fully retracted position the pin 56a abuts against the rear end of rod 56 when the rod is fully forward relative to the sleeve, with magnet 59 against the forward end of casing 55 and collar 95 abutting against the rear end of sleeve 54, as shown in FIG. 10a.

When fluid under pressure is received behind the piston into the expandable chamber 96 defined by the piston 68 and cylinder 41, the plunger actuating bar 65 is advanced to the piston stop pin 71. Until the pin 71 is engaged the cylinder 41 is in its normal forward position relative to the housing. The cylinder base plate 42 has a plate 97 secured thereto, as shown in FIG. 1a, from which depends a plate 98 adapted to receive a rod actuating sleeve 99, the plates 97 and 98 being received in an opening 100 through the rear bracket upper plate 39 and the housing base plate 43. The sleeve 99 encircles the plunger sleeve 54 with clearance, but is in registration with the collar 95 carried by the magnet rod 56. When the cylinder is in its normal forward position relative to the housing 40, and the piston 68 is advanced with the plunger sleeve 54 until the bar 65 is at the piston stop pin 71, the collar 95, when against the end of sleeve 54, will be adjacent the rod actuating sleeve 99 connected to the cylinder 41, as shown in FIG. 10b. Thereafter, since the piston is stopped by the piston stop pin, additional fluid supplied to chamber 96 will shift the cylinder 41 rearwardly against the force of spring 45 into engagement with cylinder stop pin 46, as shown in FIG. 10c. Rearward movement of cylinder 41 effects rearward movement of the magnet rod 56 (by means of sleeve 99 and collar 95) and since the plunger sleeve 54 is held in its advanced position by the bar 65 abutting against piston stop pin 71, the magnet 59 is withdrawn from the forward end of casing 55.

Preferably the magnet 59, which may be cylindrical as shown, has its poles on opposite sides of the longitudinal axis of the magnet, the magnet shown having a north pole piece 59a and a south pole piece 59b extending from the forward end of the magnet, as shown in FIGS. 6 and 7. The casing 55 comprises a nonmagnetic stainless steel sleeve 55a closed at its forward end by face 55b. The face 55b constitutes a disc made of two substantially semicircular sections 55c of steel or iron of relatively high permeability separated by a brass strip 55d. When the magnet is against the end face 55b, as shown in solid lines in FIG. 6, with each pole piece in contact with one of the steel sections of the face, the magnetic flux is directed through the workpiece to exert a strong gripping force holding the workpiece against the face. However, when the magnet rod is retracted relative to plunger sleeve 54, withdrawing the magnet from the end face 55b of casing 55 to the position shown in dotted lines in FIG. 6, the magnetic gripping force is sufficiently reduced so that the workpiece is released from the face of the plunger. An even sharper reduction of the magnetic gripping force can be effected by rotating the magnet 90 degrees as it is retracted so that each pole piece on the magnet is in registration with both steel sections 55c of the casing face. To this end, as shown in FIG. 1a, a pin 101 on the magnet rod 56 is engaged with an inclined slot 102 in plunger casing 54 so that as the magnet rod is retracted relative to the plunger casing the rod will be rotated the desired amount.

This preferred construction of the magnet assembly offers many advantages. The magnet is at all times completely enclosed inside its casing. The casing side wall is of non-magnetic material so the attraction for metallic particles is lessened. The attraction of the end face for particles is substantially reduced as the magnet is withdrawn therefrom so that the coolant, which is generally used in grinding operations, will be effective to remove any particles which may have collected thereon.

As shown in FIG. 8, fluid from sump 105 is delivered under pressure by pump 106 to pressure line 107, a relief valve 104 being connected between line 107 and sump 105 to establish the maximum pressure in the pressure line. Pressure line 107 is connected to pressure port 108 of a solenoid operated control valve 109. The valve 109 has two motor ports 110, 111, and when the solenoid S1 is deenergized and the valve member 112 is held in the position shown in FIG. 8 by spring 113, pressure port 108 is connected to motor port 110 while motor port 111 is connected to discharge port 114. Discharge port 114 and a second discharge port 115 are connected to return line 116 leading to the sump.

Motor port 110 is connected by line 117, check valve 118 and line 119 to port 120 (see FIG. 10a) of the expandable forward chamber 121 of cylinder 41. Motor port 111 of valve 109 is connected by line 122 to port 123 of the rear chamber 96 of cylinder 41. Thus when the solenoid S1 is deenergized, pressure is supplied through valve 109, line 117, check valve 118, and line 119 to chamber 121, constituting one side of the hydraulic motor defined by cylinder 41 and piston 68, and chamber 96, constituting the other side of the motor, is connected to discharge through line 122 and valve 109. This pressure differential across the motor causes the piston 68, bar 65, and plunger 53 to retract. When solenoid S1 is energized and valve member 112 is shifted to the left of the position shown in FIG. 8, pressure port 108 is connected to motor port 111 and motor port 110 is connected to discharge port 115. Pressure is supplied through the valve 109 and line 122 to the rear chamber 96 of cylinder 41. Discharge from forward chamber 121 of cylinder 41 cannot pass from line 119 to line 117 (which is connected to motor port 110 in valve 109) through check valve 118. Two paths are provided for connection of line 119 to line 117 around the check valve 118. One path passes through the control valve 48 and includes lines 124 and 125 connected, respectively, to lines 117 and 119, and ports 126 and 127 of valve 48 connected, respectively, to lines 124 and 125. The valve member 129 of valve 48 is shifted to the left (as shown in FIG. 8) by bar 65 depressing the extending rod 130 and is shifted by spring 131 to the right of the position shown, or advanced, when bar 65 advances to release rod 130. The valve member 129 defines an annular passage 128 which connects ports 126 and 127 when the valve member 129 is fully advanced. The other path connecting line 119 to line 117 around the check valve 118 occurs through the throttle valve 132 which is connected across lines 124 and 125 between the check valve 118 and the valve 48.

When the valve member 129 is held in the retracted position shown by engagement with the plunger actuating bar 65, the path through valve 48 around check valve 118 is blocked so that discharge from the forward piston chamber 121 must occur through valve 132. However, when the bar 65 is advanced to release valve member 129 for movement to the right of the position shown, unthrottled discharge can occur around check valve 118 through valve 48. Thus, when the solenoid S1 is energized, pressure is supplied to the rear chamber 96 of cylinder 41 and a pressure differential is produced across the motor (since the forward chamber 121 is connected through the throttle valve 132 to discharge) to advance the motor piston 68 from a retracted position. However, until the piston 68 to which bar 65 is connected advances a sufficient distance to open up the discharge path through valve 48, thereby increasing the pressure differential across the motor, the advance of the piston occurs at a controlled rate determined by the setting of throttle valve 132. After the piston has advanced at this controlled rate sufficiently far for the valve member 129 to connect ports 126 and 127, the advance of the piston will occur at a rapid rate.

As shown in FIG. 1a, the limit switch LS1 is connected to side plate 37 of the rear bracket and extends through an opening in forward end plate 36 for operation by collar 66 when sleeve 54 is fully retracted. Limit switch LS2 is also connected to side plate 37 of the rear bracket for operation by plate 98 when the cylinder 41 reaches its rear position in housing 40.

When, as shown in FIG. 10a, the piston 68 is retracted with bar 65 against sleeve 72 and the sleeve 54 of the plunger in its fully retracted position, the workpiece receiving trough 75 is elevated to the magazine 11 and a workpiece received thereon. At this time the cylinder 41, under the influence of spring 45, is in its forward position in the housing 40 and rod 56 is in its forward position relative to sleeve 54 with the collar 95 against the end of sleeve 54. As the bar 65 approached sleeve 72 the rod 130 was depressed to block the discharge passage from forward chamber 121 through valve 48 and, as the plate 65 reached sleeve 72, limit switch LS1 was operated. As shown in FIG. 9, if switch SW1 is closed, operation of limit switch LS1 energizes control relay CR which is sealed in through its own contact and the normally closed contact of limit switch LS2 since limit switch LS2 is unoperated at this time. When control relay CR is energized solenoid S1 is energized through the normally open contacts of relay CR and the valve member 112 of valve 109 is shifted to the left of the position shown in FIG. 8 to connect pressure port 108 of the valve to motor port 111 thereof and connect motor port 110 to discharge port 115. The plunger 53 advances at a controlled rate determined by the setting of valve 132, lowering the workpiece trough as the plunger advances toward the position shown in FIGS. 1a and 1b. In the illustrated cycle described herein the throttle valve should be adjusted so that the previous workpiece will have been ejected before the plunger and the workpiece receiving trough reach the positions shown in FIGS. 1a and 1b. When the plunger 53 reaches the position shown in FIGS. 1a and 1b, the workpiece receiving trough 75 is in its extreme lower position and the rollers 70 connected to sleeve 54 of the plunger disengage from the slots 86. At the same time valve member 129 connects ports 126 and 127 in valve 48 to provide a free flow discharge passage from chamber 121 of cylinder 41. Thus the plunger 53 moves more rapidly to the right, contacting and gripping a workpiece 10 on the trough 75 and advancing it rapidly toward the grinding throat.

As the piece is thrust into the grinding throat 12 the piston rod 69 and bar 65 abut against stop pin 71, as shown in FIG. 10b, abruptly stopping the workpiece in the operating position adjacent rod 18 in the throat. The rod 18 serves, not only to eject the workpiece after the operation thereon, but also to prevent axial advance thereof during grinding. At this time the magnet 59 is against the forward face 55b of the casting 55 to maintain a firm magnetic grip on the workpiece as the plunger is abruptly stopped so that full control of the workpiece is maintained. As shown in FIG. 10b, with the plunger 53 in its extreme forward position and the magnet 59 and rod 56 in their forward position within the sleeve 54 of plunger 53, collar 95 abuts against the magnetic rod actuating sleeve 99. When the piston rod 69 and bar 65 abut against piston stop pin 71, the piston has not completed its stroke in cylinder 71 so that continued supply of fluid to chamber 96 of cylinder 41 causes further expansion of that chamber. Since piston 68 cannot advance because of stop pin 71, cylinder 41 is retracted within the housing 40, against the force of spring 45, to abut against cylinder stop pin 46 in the housing. Since the bar 65 is held against stop pin 71, the sleeve 54 of the plunger assembly is held in its forward position. Rearward movement of the cylinder 41 in housing 40 effects, by means of sleeve 99 and collar 95, rearward movement of the magnet rod 56 so that before there is any retraction of plunger 53, the magnet is retracted within the plunger casing 55 to release its magnetic grip on the workpiece.

As the cylinder 41 shifts to its extreme rearward position within the housing 40 to effect release of the magnetic grip on the workpiece, limit switch LS2 is operated, as shown in FIG. 10c. Since limit switch LS1 was released when the plunger 53 was initially advanced, control relay CR will drop out, releasing solenoid S1. This causes valve member 112 of valve 109 to shift to the position shown in FIG. 8, connecting pressure port 108 to motor port 110 and motor port 111 to discharge port 114. This connects chamber 96 of cylinder 41 to return line 116 through the valve 109 and connects pressure to line 117 and, through check valve 118 and line 119, to the forward chamber 121 of cylinder 41 to retract the plunger. As the piston rod 69 retracts from stop pin 71 the cylinder 41 is shifted to its forward position in housing 40, and limit switch LS2 is released. The rod 56 and magnet 59 are in their rearward position relative to sleeve 54 as the plunger retracts, but as the plunger approaches its rear position the rod 56 will engage magnet rod stop pin 56a. As plunger sleeve 54 moves into its extreme retracted position, rod 56 and magnet 59 will assume their forward position within sleeve 54 as shown in FIG. 10a. Also as sleeve 54 approaches its retracted position rollers 79 will engage slots 86 and the workpiece receiving trough 75 will be elevated to the magazine 11. Limit switch LS1 will be operated when the plunger is fully retracted to commence another loading cycle.

What is claimed is:

1. In a centerless grinding machine, the combination comprising means defining a grinding throat, a plunger having a forward end adapted to receive a workpiece, a permanent magnet slidably received in said plunger operable when adjacent the forward end thereof to secure a workpiece thereto, said magnet ineffective to hold a workpiece on the forward end of the plunger when the magnet is retracted therefrom, means to reciprocate said plunger between a retracted position and a predetermined advanced position where a workpiece secured thereto is in the grinding throat, means to retract said magnet from the forward end of the plunger after advance of the plunger is stopped and the plunger is in said predetermined advanced position for release of a workpiece in the grinding throat, and means to move the plunger to said retracted position while said workpiece is in the grinding throat.

2. In a centerless grinding machine, the combination comprising means defining a grinding throat to a receive a workpiece for grinding, a plunger having a closed casing at the forward end, a permanent magnet slidably received in said casing operable when adjacent the forward end of the casing to secure a workpiece thereto, said magnet ineffective to hold a workpiece on the end of the casing when the magnet is retracted therefrom, a motor operatively connected to the plunger to advance and retract the plunger along a linear path relative to the grinding throat, means operable in response to retraction of the plunger to move the magnet to the forward end of the casing and initiate operation of the motor in one direction to advance the plunger, means operable in coordination with movement of the plunger to deposit a workpiece in the path of the plunger to be gripped and moved by the plunger as the plunger advances to the grinding throat, means to stop advance of the plunger in a predetermined advanced position adjacent the grinding throat to stop a workpiece magnetically gripped thereby in the grinding throat, means operable in coordination with movement of the plunger to retract the magnet within the casing after the plunger is stopped adjacent the grinding throat for release of a workpiece within the grinding throat, and means operable in response to retraction of the magnet within the casing to reverse the motor and effect retraction of the plunger while the workpiece is in the grinding throat.

3. In a centerless grinding machine having a grinding throat to receive a workpiece for grinding, a workpiece loader comprising in combination a plunger having a forward end adapted to receive a workpiece, a permanent magnet slidably received in said plunger operable when adjacent the forward end thereof to secure a workpiece thereto, said magnet ineffective to hold a workpiece on the end of the plunger when the magnet is retracted therefrom, a hydraulic cylinder shiftable a predetermined amount and normally biased toward the grinding throat, said cylinder having a piston slidably received therein and operatively connected to the plunger, means to position the magnet adjacent the forward end of the plunger prior to advance of the plunger for gripping a workpiece deposited in front of the plunger, means to supply fluid under pressure behind the piston to advance the plunger and a workpiece gripped thereby toward the grinding throat, a positive stop to arrest forward movement of the piston and the plunger when the workpiece magnetically held by the plunger is in the grinding throat, said cylinder shifting rearwardly when forward advance of the piston is stopped, means responsive to rearward movement of the cylinder to retract the magnet within the plunger and thereby release the workpiece from the plunger, and means to supply fluid under pressure in front of the piston to retract the plunger from the grinding throat.

4. In a centerless grinding machine having a grinding throat to receive a workpiece for grinding, a workpiece loader comprising in combination, a frame mounted adjacent the grinding throat, a hydraulic cylinder mounted on the frame for limited movement thereon and normally biased toward the grinding throat, said cylinder having a piston slidably mounted therein, a plunger having a closed casing at one end operatively connected to said piston for axial movement along a path towards and away from the grinding throat in response to movement of the piston, means operable in response to movement of the plunger to deposit a workpiece on each stroke of the plunger in said path when the plunger is retracted from the grinding throat, a permanent magnet slidably received in said casing operable when adjacent the forward end of the casing to hold a workpiece on the end of the casing, said magnet ineffective to hold a workpiece on the end of the casing when the magnet is retracted therefrom, a positive stop mounted in the frame to arrest forward movement of the piston and plunger at a position where a workpiece magnetically held to the casing is in the grinding throat, a hydraulic valve connected to the cylinder and operable in one position to produce a pressure differential across the piston sequentially to advance the piston and plunger until forward movement thereof is arrested and thereafter to retract the cylinder, a magnet rod extending outside the plunger operable in response to retraction of the cylinder to retract the magnet from the face of the plunger casing, means to shift said hydraulic valve to reverse the pressure differential across the piston and retract the plunger from the grinding throat, and a positive stop mounted in the frame to advance the magnet within the casing as the plunger retracts.

5. In a centerless grinding machine, the combination comprising means defining a grinding throat, a plunger having a closed forward end face adapted to receive a workpiece, said end face having two spaced apart sections of high permeability, a permanent magnet slidably received in said plunger having two spaced poles on the forward face thereof, said magnet operable when the poles thereof are in registration with and adjacent to said plunger face sections, respectively, to secure a workpiece to the end face of the plunger, said magnet ineffective to hold a workpiece on the forward end face of the plunger when the magnet is shifted relative thereto, means to reciprocate said plunger horizontally along a linear path between a retracted position and a predetermined position where a workpiece secured thereto is in the grinding throat, and means to shift the magnet relative to the forward end face of the plunger after the plunger is stopped in said predetermined position for release of a workpiece in the grinding throat.

6. In a centerless grinding machine having a grinding throat to receive a workpiece for grinding, a workpiece loader comprising in combination a plunger having a forward end adapted to receive a workpiece, a permanent magnet slidably received in said plunger operable when adjacent the forward end thereof to secure a workpiece thereto, said magnet ineffective to hold a workpiece on the end of the plunger when the magnet is retracted therefrom, a hydraulic motor comprising a cylinder shiftable relative to the grinding throat and a piston connected to the plunger, means operable in coordination with movement of the plunger to deposit a workpiece in the path of the plunger, means to produce a predetermined pressure differential across said motor to advance the piston and the plunger at a controlled rate, means responsive to the position of the plunger to increase said pressure differential and accelerate the plunger during the advance thereof, means to stop the piston in a predetermined position to stop a workpiece magnetically gripped by the plunger in the grinding throat, said means thereby causing retraction of the cylinder, means connected to the cylinder to retract the magnet within the plunger for release of the workpiece within the grinding throat, and means to reverse the pressure differential across the motor after the cylinder has retracted to retract the piston and plunger.

7. In a centerless grinding machine having a grinding throat to receive a workpiece for grinding, a workpiece loader comprising in combination a plunger having a forward end adapted to receive a workpiece, a magnet operable when rendered effective to secure a workpiece to the forward end of the plunger, said magnet releasing the workpiece from the plunger when rendered ineffective, a shiftable hydraulic cylinder normally biased toward the grinding throat, said cylinder having a piston slidably received therein and operatively connected to the plunger, means to render the magnet effective to hold a workpiece deposited in front of the plunger to the plunger, means to supply fluid under presure behind the piston to advance the plunger and a workpiece magnetically held thereby toward the grinding throat, a positive stop to arrest forward movement of the piston and the plunger when the workpiece magnetically held by the plunger is in the grinding throat, said cylinder shifting rearwardly when forward advance of the piston is stopped, and means responsive to rearward movement of the cylinder to render the magnet ineffective.

8. In a centerless grinding machine having a grinding throat to receive a workpiece for grinding, a workpiece loader comprising in combination, a frame mounted adjacent the grinding throat, a hydraulic motor comprising a cylinder member having a piston member slidably received therein, one of said motor members mounted on the frame for limited movement relative thereto and normally biased toward the grinding throat, the other of said motor members movable relative to said one motor member in response to a presure differential produced across the motor, a plunger connected to said other motor member, a permanent magnet slidably received in said plunger operable when adjacent the forward end thereof to hold a workpiece on the forward end of the plunger, said magnet ineffective to hold a workpiece on said end of the plunger when the magnet is retracted therefrom, means to position the magnet adjacent the forward end of the plunger prior to advance of the plunger for gripping of a workpiece deposited in front of the plunger, means to produce a pressure differential across the motor to advance the plunger and a workpiece magnetically gripped thereby toward the grinding throat, a positive stop to arrest forward movement of said other motor member and the plunger when the workpiece magnetically held by the plunger is in the grinding throat, said one motor member shifting rearwardly when forward advance of said other motor member is stopped, and means responsive to rearward movement of said one motor member to retract the magnet within the plunger and thereby release the workpiece from the plunger.

9. In a centerless grinding machine having a grinding throat to receive a workpiece for grinding, a workpiece loader comprising in combination, a frame mounted adjacent the grinding throat, a hydraulic motor comprising a cylinder member having a piston member slidably received therein, one of said motor members mounted on the frame for limited movement relative thereto and normally biased toward the grinding throat, the other of said motor members movable relative to said one member in response to a presure differential produced across the motor, a plunger connected to said other motor member, a magnet operable when rendered effective to secure a workpiece to the forward end of the plunger, said magnet releasing the workpiece from the plunger when rendered ineffective, means to render the magnet effective, means to produce a pressure differential across the motor to advance the plunger and a workpiece magnetically held thereby toward the grinding throat, a positive stop to arrest movement of said other motor member and the plunger when the workpiece held by the plunger is in the grinding throat, said one motor member shifting rearwardly when forward advance of the other motor member is stopped, and means responsive to rearward movement of said one motor member to render the magnet ineffective.

References Cited in the file of this patent

UNITED STATES PATENTS

| | | |
|---|---|---|
| 2,063,939 | Lott | Dec. 15, 1936 |
| 2,462,235 | Swenton | Feb. 22, 1949 |
| 2,733,824 | Ruppe | Feb. 7, 1956 |
| 2,784,534 | Townsend et al. | Mar. 12, 1957 |
| 2,788,620 | Marcus et al. | Apr. 16, 1957 |

FOREIGN PATENTS

| | | |
|---|---|---|
| 886,107 | Germany | Aug. 10, 1953 |